United States Patent [19]

Takashima

[11] Patent Number: 5,970,396
[45] Date of Patent: Oct. 19, 1999

[54] DIVERSITY RECEIVER

[75] Inventor: Katsunori Takashima, Tokyo, Japan

[73] Assignee: NEC Corporation, Tokyo, Japan

[21] Appl. No.: 08/896,673

[22] Filed: Jul. 18, 1997

[30] Foreign Application Priority Data

Jul. 19, 1996 [JP] Japan .................................. 8-190780

[51] Int. Cl.[6] .......................... H04B 17/02; H04B 17/00; H04B 1/06
[52] U.S. Cl. ...................... 455/135; 455/134; 455/226.2; 455/277.2
[58] Field of Search .................... 455/132, 133, 455/134, 135, 226.1, 226.2, 226.3, 272, 277.1, 277.2; 375/347

[56] References Cited

U.S. PATENT DOCUMENTS

| 5,390,342 | 2/1995 | Takayama et al. | 455/134 |
|---|---|---|---|
| 5,396,645 | 3/1995 | Huff | 455/134 |
| 5,621,770 | 4/1997 | Zastera | 455/135 |
| 5,648,992 | 7/1997 | Wright et al. | 455/134 |
| 5,740,526 | 4/1998 | Bonta et al. | 455/134 |
| 5,805,643 | 9/1998 | Seki et al. | 455/134 |

FOREIGN PATENT DOCUMENTS

| 51-11509 | 1/1976 | Japan . |
|---|---|---|
| 58-56536 | 4/1983 | Japan . |
| 62-43925 | 2/1987 | Japan . |
| 2-13021 | 1/1990 | Japan . |
| 6-56993 | 7/1994 | Japan . |

OTHER PUBLICATIONS

Japanese Office Action dated Oct. 7, 1998 with English language translation of Japanese Examiner's comments.

*Primary Examiner*—Paul Loomis
*Attorney, Agent, or Firm*—Whitham, Curtis & Whitham

[57] ABSTRACT

A diversity receiver having a pair of receiving circuits, which is capable of disconnecting a faulty receiving circuit from its operation for preventing a communication quality from being degraded due to mis-selection of output signal of the faulty receiving circuit in a case of signal level being received is too low to discriminate between output signals of the faulty receiving circuit and the normal receiving circuit, is provided. The diversity receiver includes a first and second error rate accumulation circuits, each is coupled with corresponding receiver circuit, to accumulate error rate of each receiver circuit in a timing generated by a timing generator circuit. In combination of six judge circuits, first judge circuit to sixth judge circuits, and input of error accumulation value of each receiving circuit, it is judged whether or not there exist a fault in a receiving circuit and which receiving circuit is faulty. Then, a control circuit disconnects one of receiving circuit judged as faulty from its operation by fixing switch to a normal receiving circuit.

7 Claims, 5 Drawing Sheets

DIVERSITY RECEIVER

BACKGROUND OF THE INVENTION

1. Field of the Invention

The present invention relates to a receiver of the diversity system and, particularly, to a diversity receiver having a fault detecting function for reducing degradation of a receiving signal quality due to fault.

2. Description of the Related Art

A conventional diversity receiver of this kind has been used to improve degradation of error rate in a receiver of a radio communication system due to fading, as disclosed in, for example, Japanese Patent Application Laid-open No. Hei 6-204925.

FIG. 5 is a block diagram showing one of examples of conventional diversity receivers. As shown in FIG. 5, the diversity receiver includes a first receiving circuit 1, a second receiving circuit 2, a switch 3 and a receiving level detection circuit 4.

The first receiving circuit 1 is input with a first receiving signal 21 and outputs a first receiving data 23 and a first receiving level data 25 indicative of an electric field intensity of the first receiving signal 21. On the other hand, the second receiving circuit 2 is input with a second receiving signal 22 and outputs a second receiving data 24 and a second receiving level data 26 indicative of an electric field intensity of the second receiving signal 22. It is noted that the first receiving signal 21 and the second receiving signal 22 are the same signal, but received by a different antenna located in a different position respectively.

Further, the receiving level judge circuit 4 is input with the first receiving level data 25 and the second receiving level data 26, compares them and judges one of them whose electric field intensity is higher than the other and outputs the judging result as a level judge signal 30. The switch 3 has inputs supplied with the first receiving data 23 and the second receiving data 24 and outputs one of the receiving data 23 and 24 whose electric field intensity is higher according to the level judge signal 30 from the receiving level judge circuit 4.

In the foregoing conventional diversity receiver, when the receiving signal is weak and its signal level is low, there may be a case where the receiving level data of a fault receiving circuit, which does not output receiving data properly, becomes the same as that of a normal receiving circuit. Therefore, there may be a case where, although the receiving data of the normal receiving circuit is to be selected, the receiving data of the fault receiving circuit is selected and thus there is a defect that the communication quality is degraded when the receiving level is low and one of the receiving circuits is faulty.

SUMMARY OF THE INVENTION

An object of the present invention is, therefore, to provide a diversity receiver capable of detecting a fault of a receiving circuit thereof and reducing the degradation of communication quality by disconnecting the faulty receiving circuit from its operation.

A diversity receiver according to the present invention is provided with a pair of receiving circuits for receiving radio signal through an antenna being connected to a respective receiver circuit, and for outputting receiving data, including an error rate, and receiving level data, indicating an electric field intensity; receiving level judge means for judging one of the pair of receiving circuits outputting higher level of the receiving level data, and for selecting and outputting the receiving data of the receiving circuit being judged; and fault detection means for calculating the error rate of the receiving data of each of the pair of receiving circuits, and for detecting a faulty receiving circuit by the result of calculated error rate, and for disconnecting the detected faulty receiving circuit from operation.

That is, a diversity receiver according to the present invention is provided with fault detection means in addition to the conventional diversity receiver, and the fault detection means detect fault state of one of receiver circuits included in the diversity receiver, discriminate which receiving circuit is faulty, and disconnect the faulty receiving circuit from its operation for preventing being selected by accident due to low level of receiving signal.

Therefore, the fault detection means comprises the following components to realize the object.

1) error rate accumulation means, coupled with the receiving circuits, for accumulating error rate of the receiving data output from each of the receiving circuits;

2) error rate judge means, coupled with the error rate accumulation means for detecting fault state of one of said pair of receiving circuits based on comparing the accumulated error rate with predetermined values, for discriminating faulty receiving circuit whose accumulated error rate being higher than another; and 3) control means, coupled with the error judge means, for disconnecting the receiving circuit, from its operation, detected and discriminated as faulty by the error rate judge means.

In the error rate accumulation means, a timing generation circuit for generating a timing signal is provided. As an error in the receiving circuit may occur due to not only fault but also fading of radio signal or some other intermittent reasons, it is necessary to accumulate errors only caused by fault of the receiving circuit, and this timing signal is used for this purpose.

BRIEF DESCRIPTION OF THE DRAWINGS

The present invention will be described in detail with reference to the accompanying drawings, in which.

DETAILED DESCRIPTION OF THE PREFERRED EMBODIMENTS

Figure 1:
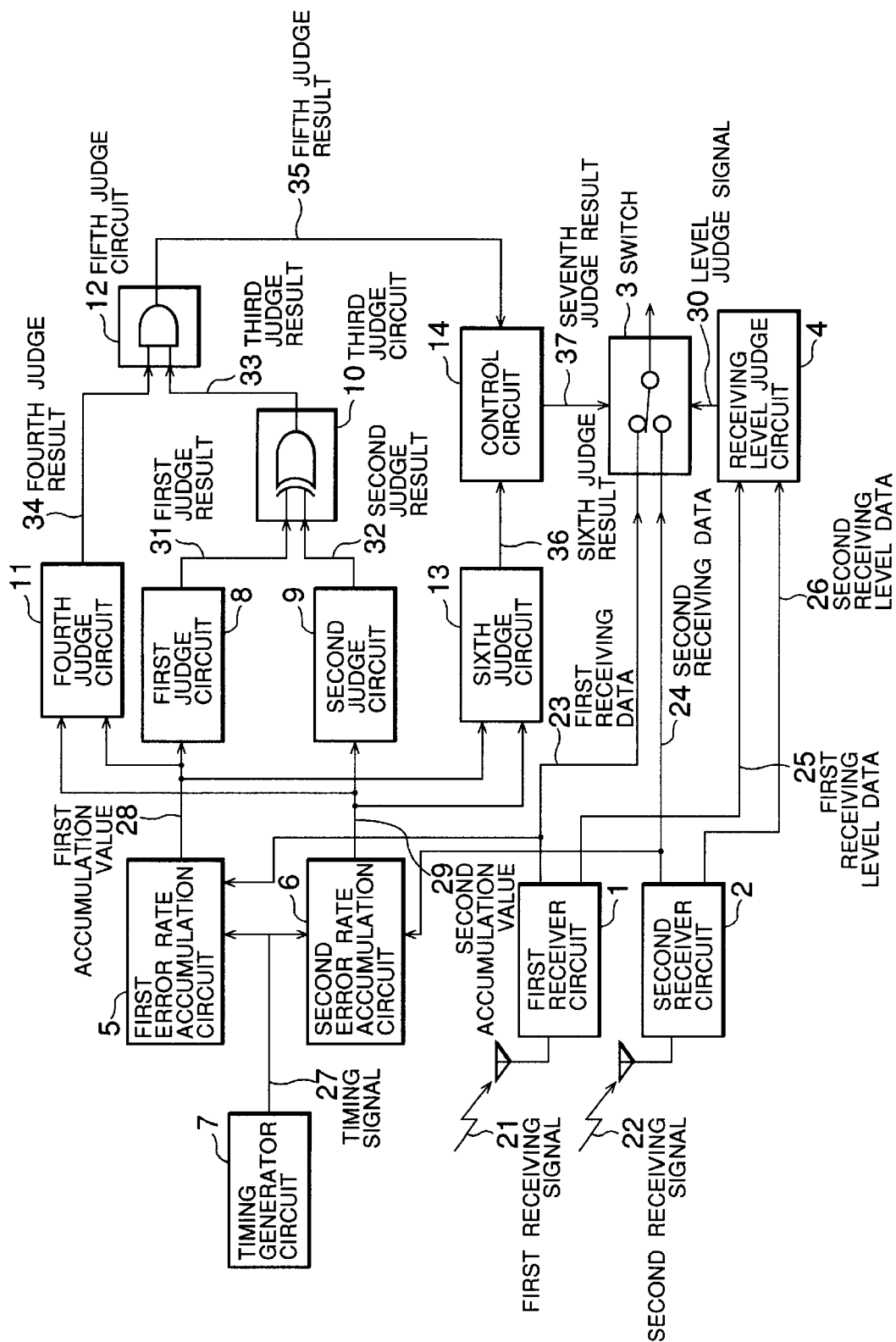
FIG. 1 is a block circuit diagram showing a construction of a diversity receiver according to an embodiment of the present invention.

FIG. 1 is a block circuit diagram showing a construction of a diversity receiver according to an embodiment of the present invention.

Referring to FIG. 1, the diversity receiver includes a first receiving circuit 1, a second receiving circuit 2, a switch 3 and a receiving level detection circuit 4, as in the case of the conventional diversity receiver. The diversity receiver according to the present invention further includes a first error rate accumulator circuit 5, a second error rate accumulator circuit 6, a timing generator circuit 7, a first judge circuit 8, a second judge circuit 9, a third judge circuit 10, a fourth judge circuit 11, a fifth judge circuit 12, a sixth judge circuit 13, all of which constitute fault detection means, and a control circuit 14 which constitutes means for disconnecting a receiving circuit from the diversity receiver when the receiving circuit is detected as being faulty.

The first receiving circuit 1 is input with a first receiving signal 21 and outputs a first receiving data 23 and a first receiving level data 25 indicative of an electric field intensity of the first receiving signal 21. The second receiving circuit 2 is input with the second receiving signal 22 and outputs a second receiving data 24 and a second receiving level data 26 indicative of the electric field intensity of the second receiving signal 22.

The first and second receiving signals 21 and 22 are the same radio signal received through a different antenna in a different location respectively, for example, AM-modulated radio signal having a frequency in a 1.5 GHz band and the first and second receiving data 23 and 24, which are output from the first and second receiving circuits 1 and 2, are frequency-converted signals having a frequency of 450 kHz. The first and second receiving level data 25 and 26 indicate the electric field intensity of the first and second receiving signals 21 and 22 in, for example, voltage from 0V to 5V.

The receiving level judge circuit 4 is input with the first receiving level data 25 and the second receiving level data 26, compares those level data and judges one of them whose electric field intensity is higher and outputs a result of judgement as a level judge signal 30.

The switch 3 is input with the first receiving data 23 and the second receiving data 24 and switches a connection to one of the first and second receiving data 23 and 24 whose electric field intensity is higher, according to the level judge signal 30 from the receiving level judge circuit 4.

The timing generator circuit 7 generates a timing signal 27 at a timing a period of which is long enough to discriminate between degradation of error rate in a short time due to fading and degradation of error rate due to fault of the receiver, for example, every 2 seconds, in a case where error rate of the first and second receiving circuits 1 and 2 are to be measured.

The first error rate accumulator circuit 5 is input with the first receiving data 23 and the timing signal 27, accumulates error rate from the first receiving data 23 in a time period of the timing signals 27, for example, every 2 seconds, and outputs a first accumulation value 28. On the other hand, the second error rate accumulator circuit 6 is input with the second receiving data 24 and the timing signal 27, accumulates error rate from the second receiving data 24 in the time period of the timing signals 27 and outputs a second accumulation value 29.

The first judge circuit 8 is input with the first accumulation value 28, judges whether it is not higher than a first threshold value A (for example, A=2%) and outputs a first judge result 31, e.g. a judge result of "good" or "0" for not a higher value, and "bad" or "1" for a higher value.

The second judge circuit 9 is input with the second accumulation value 29, judges whether it is not higher than a first threshold value A and outputs a second judge result 32, and example of the second judge result is the same as the case of the first judge result.

The third judge circuit 10 is input with the first judge result 31 and the second judge result 32, judges whether or not they are coincident and outputs a third judge result 33, i.e. no output is obtained when both results are coincident and output (e.g. "1") is obtained when only one of the results is "good" or "bad."

The fourth judge circuit 11 is input with the first accumulation value 28 and the second accumulation value 29, judges whether or not a difference between these accumulation values is not smaller than a second threshold value B (for example, B=2.5%) and outputs a fourth judge result 34. For example, the fourth judge result "1" is output when the difference value of error accumulation value between the first accumulation value 28 and the second accumulation value 2 exceeds the second threshold value (2.5%).

The fifth judge circuit 12 is input with the third judge result 33 and the fourth judge result 34, judges whether the third judge result 33 indicates non coincidence ("1") and the fourth judge result 34 indicates not smaller than the second threshold value B ("1"), and outputs a fifth judge result 35 (the judge result "1" when both inputs are "1").

Further, the sixth judge circuit 13 is input with the first accumulation value 28 and the second accumulation value 29, compares both values and judges error rate of one of the first and second accumulation values which is higher and outputs discrimination information which accumulation value is higher as a sixth judge result 36.

The control circuit 14 is input with the fifth judge result 35 and the sixth judge result 36, and outputs the discrimination information of the sixth judge result 36 as a seventh judge result 37, when the third judge result 33 indicates that the first and second judge results 31 and 32 are not coincident and the fourth judge result 34 indicates that the difference between the first and second accumulation values is not smaller than the second threshold value B.

Now, constructions of the first judge circuit 8, the second judge circuit 9, the third judge circuit 10, the fourth judge circuit 11, the fifth judge circuit 12 and the sixth judge circuit 13 will be described.

Figure 3:
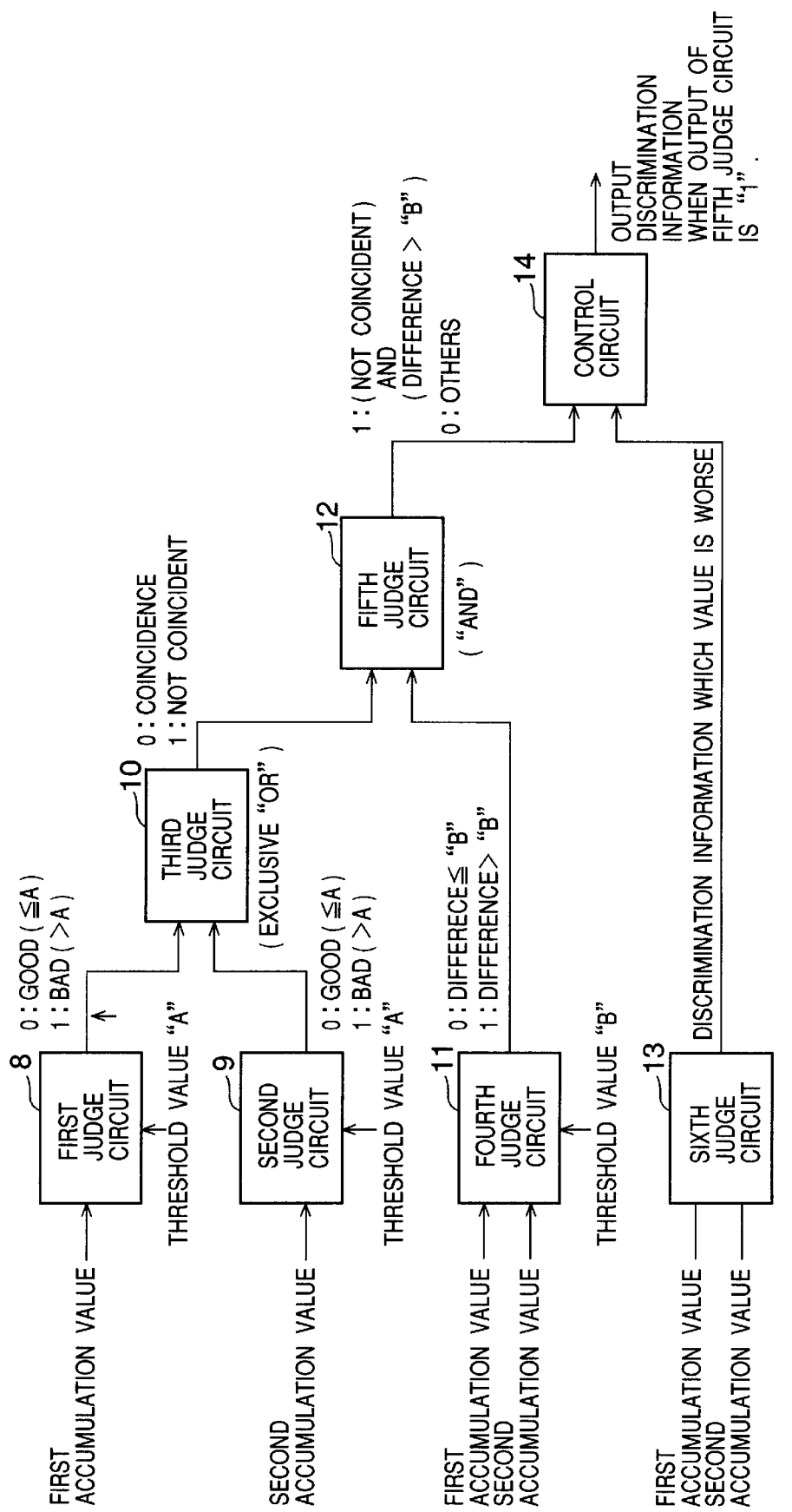
FIG. 3 is a block diagram showing a connection relationship among six judge circuits and a control circuit shown in FIG. 1.

FIG. 3 is a block diagram showing a connection relationship among those six judge circuits and a control circuit shown in FIG. 1.

Figure 2:
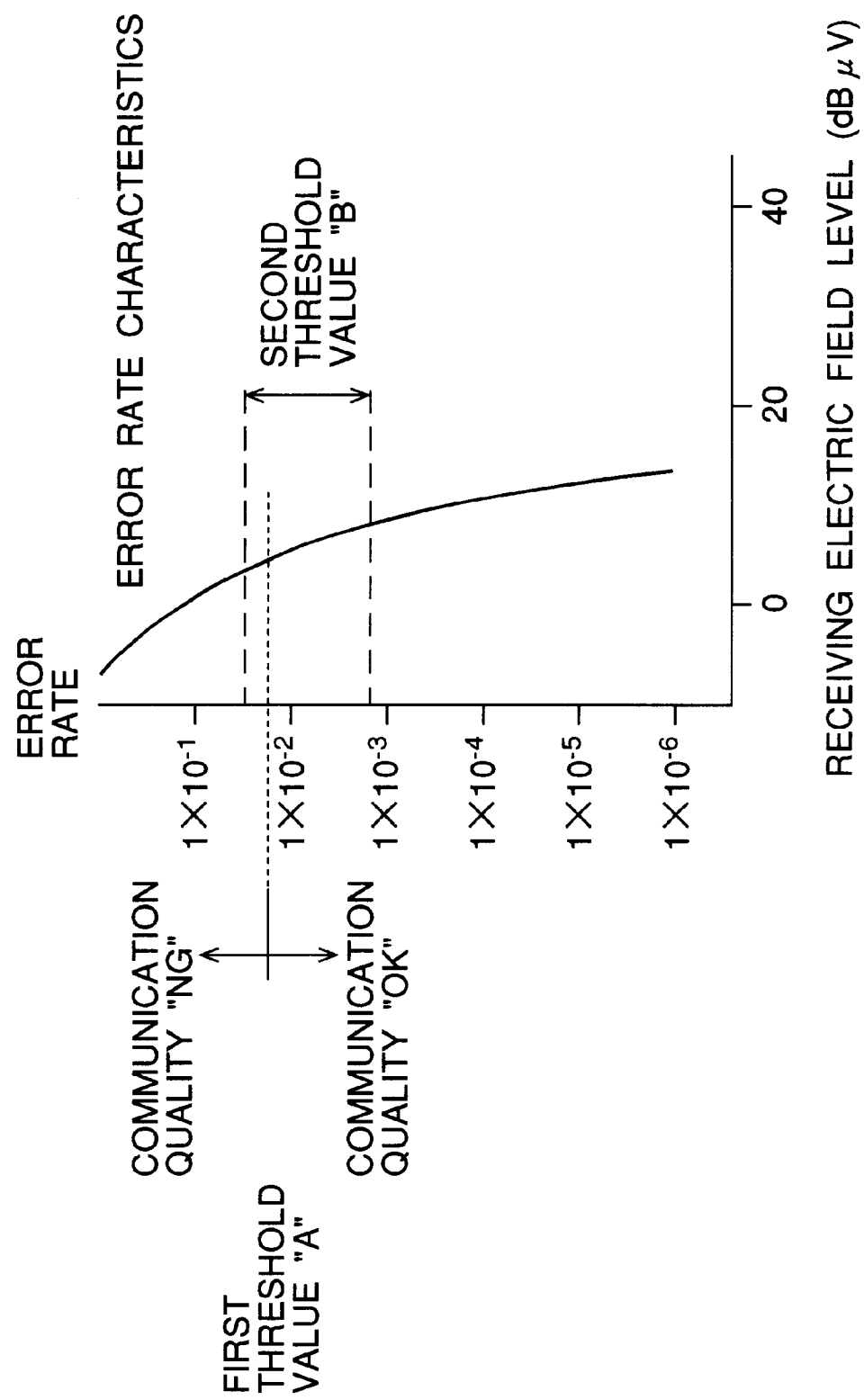
FIG. 2 is a graph showing an error rate characteristics of the diversity receiver shown in FIG. 1.

FIG. 2 is an example of a graph showing an error rate characteristics against the receiving level of the receiving circuit according to the present invention. It is assumed that the first judge circuit 8 and the second judge circuit 9 have a threshold value which is the first threshold value A (for example, A=2%).

Referring to FIG. 2, the first threshold value A is set to an error rate with which the communication quality can not be maintained. The first judge circuit 8 and the second judge circuit 9 judge whether or not the first accumulation value 28 and the second accumulation value 29 input thereto are not larger than the first threshold value A, respectively.

The third judge circuit 10 judges whether or not the first judge result 31 of the first judge circuit 8 and the second judge result 32 of the second judge circuit 9 are coincident by performing an exclusive-OR of the first judge result 31 of the first judge circuit 8 and the second judge result 32 of the second judge circuit 9, and the active output "1" is obtained only when they are not coincident.

The fourth judge circuit 11 has the second threshold value B (for example, B=2.5%). The second threshold value B is set therein for the purpose of prevention of an erroneous fault detection.

Referring to FIG. 2 again, the second threshold value B is set to a value with which the first receiving circuit 1 and the second receiving circuit 2 can be judged as being normal when a difference between the first accumulation value 28 and the second accumulation value 29 is within the second threshold value B even if the first judge result 31 of the first judge circuit 8 and the second judge result 32 of the second judge circuit 9 are not coincident.

The fifth judge circuit 12 judges whether or not a fault occurs in one of the first and second receiving circuits 1 and 2 by performing an "AND" of the third judge result of the third judge circuit 10 and the fourth judge result of the fourth judge circuit 10, and the active output "1" is obtained when one of the first and second receiving circuits 1 and 2 is regarded as faulty condition.

The sixth judge circuit 13 compares the first accumulation value 28 with the second accumulation value 29 and outputs the discrimination information of the first or second receiving circuits 1 or 2 whose error rate is larger than the other, and the control circuit 14 judges that the receiving circuit indicated by the discrimination information is faulty when the active output "1" from the fifth judge circuit 12 exists.

Now, an operation of the diversity receiver shown in FIG. 1 will be described with reference to FIG. 4.

Figure 4:
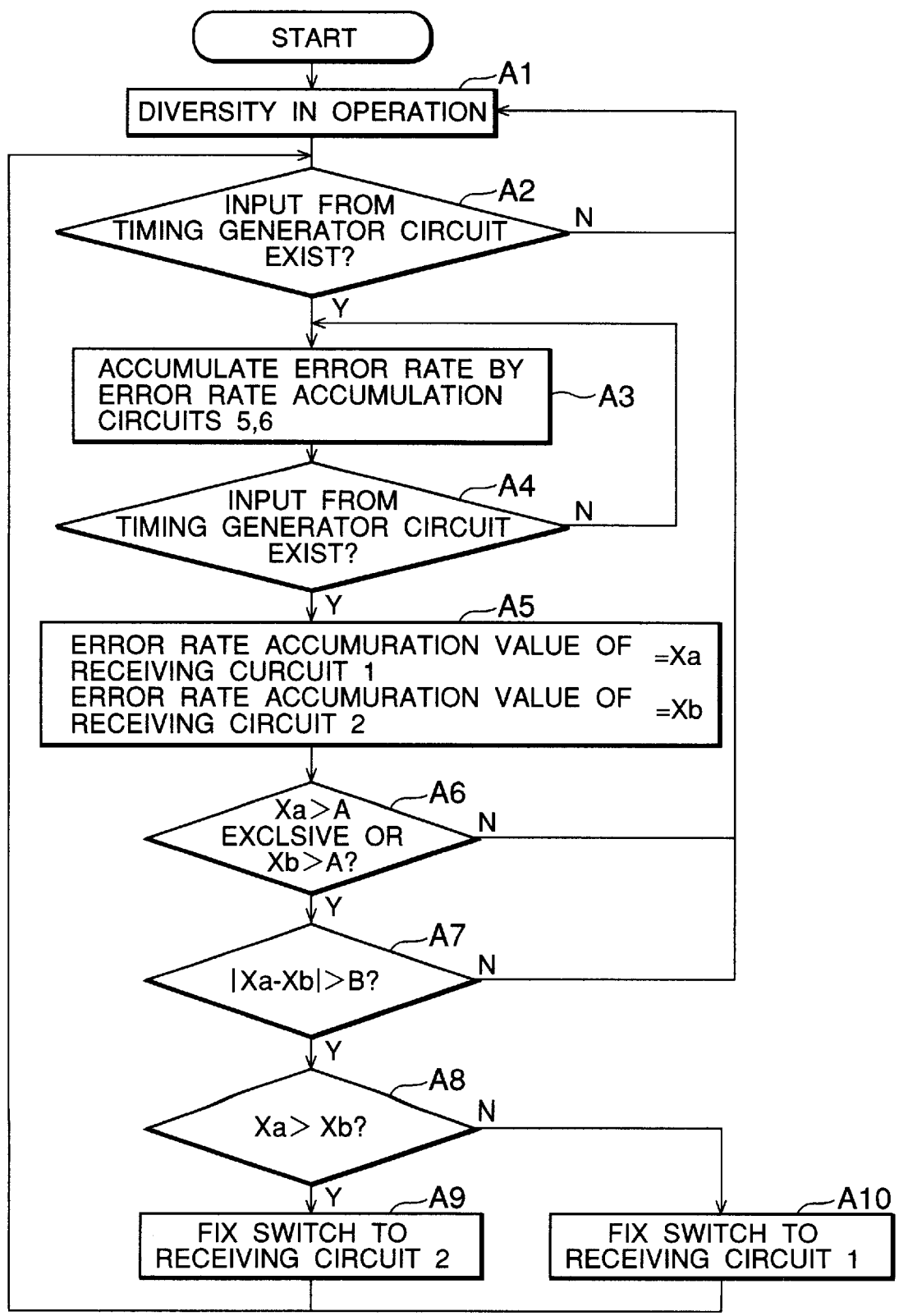
FIG. 4 is a flowchart showing an operation of the diversity receiver shown in FIG. 1.
Figure 5:
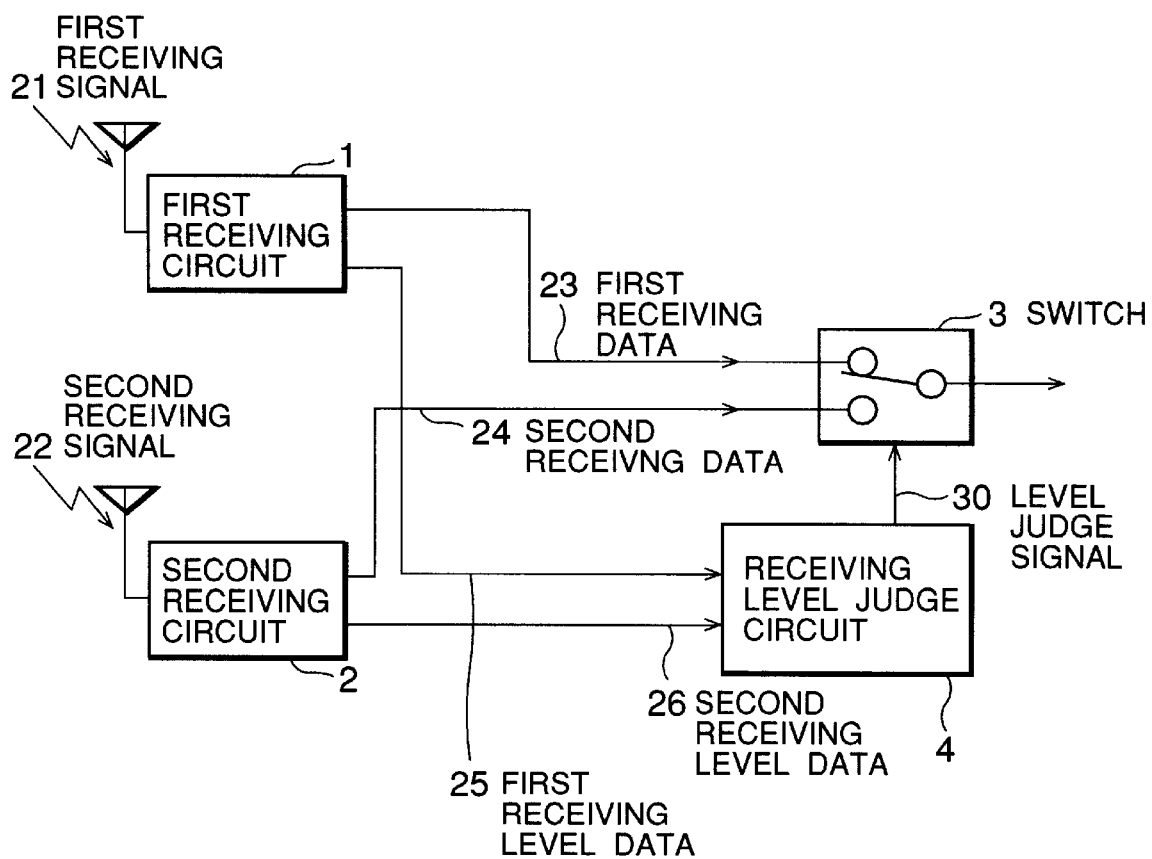
FIG. 5 is a block circuit diagram of a conventional diversity receiver.

FIG. 4 is a flowchart showing an operation of this embodiment of the present invention.

Referring to FIG. 4, in the step A1, the diversity receiver of the present invention is in diversity-operation. Then, when the first error rate accumulation circuit 5 and the second error rate accumulation circuit 6 receive the output of the timing generator circuit 7 in the step A2, the first error rate accumulation circuit 5 and the second error rate accumulation circuit 6 start calculations of error rates of the first receiving circuit 1 and the second receiving circuit 2 in the step A3.

The first error rate accumulation circuit 5 and the second error rate accumulation circuit 6 continue to accumulate the error rates until the next input from the timing generator circuit 7 is supplied to the first error rate accumulation circuit 5 and the second error rate accumulation circuit 6 in the step A4.

At a time when the next input from the timing generator circuit 7 is supplied to the first error rate accumulation circuit 5 and the second error rate accumulation circuit 6 in the step A4, the first error rate accumulation circuit 5 outputs the first accumulation value 28 of error rate and the second error rate accumulation circuit 6 outputs the second accumulation value 29 of error rate in the step A5. Assuming the first accumulation value 28=Xa and the second accumulation value 29=Xb, Xa and Xb represent the error rates of the first receiving circuit 1 and the error rate of the second receiving circuit 2 at the same time instance, respectively.

Then, in the step A6, the first judge circuit 8 and the second judge circuit 9 judge whether or not Xa and Xb are not larger than the first threshold value A, respectively, and the third judge circuit 10 exclusive-ORs the judge results of the first judge circuit 8 and the second judge circuit 9. That is, the third judge circuit 10 judges whether or not the first and second judge results of the first and second judge circuits 8 and 9 are coincident.

If they are coincident, it is judged as that there is a fault in neither the first receiving circuit 1 nor the second receiving circuit 2 and the diversity operation in the step A1 is continued.

On the other hand, if not coincident each other, it is judged that there is a possibility of fault in the first receiving circuit 1 or the second receiving circuit 2.

In a case where the third judge result of the third judge circuit 10 in the step A6 indicates that the judge results of the first and second judge circuits 8 and 9 are not coincident, the fourth judge circuit 11 judges in the step A7 whether or not a difference between Xa and Xb which are the accumulation values of the first and second error rate accumulation circuits 5 and 6 is not smaller than the second threshold value B. Then, when the fourth judge result of the fourth judge circuit 11 indicates that the difference is smaller than the threshold value B in the step A7, there is no possibility of fault in the first and second receiving circuits 1 and 2 and the diversity operation in the step A1 is continued.

When the fourth judge result of the fourth judge circuit 11 indicates that the difference is not smaller than the threshold value B, it is judged that there is a fault in the first receiving circuit 1 or the second receiving circuit 2. That is, if Xa>Xb, the first receiving circuit 1 is faulty and, if Xa<Xb, the second receiving circuit 2 is faulty.

Then, if Xa>Xb in the step A8, the switch 3 selects a connection to the second receiving circuit 2 in the step A9. On the other hand, if Xa<Xb in the step A8, the switch 3 selects a connection to the first receiving circuit 1 in the step A10. Then, after the switch 3 selects the connection to the second receiving circuit 2 or the first receiving circuit 1 in the steps A9 and A10, the operation is returned to the step A2 to continue the fault detection. When it is judged through the continuation of the fault detection that there is no fault, the diversity operation is resumed.

Now, an operation of the diversity receiver shown in FIG. 1 with the first threshold value A=2% and the second threshold value B=2.5% will be described in detail. Referring to FIG. 4, in the step A1, the diversity receiver of the present invention is in diversity-operation. Then, when the first error rate accumulation circuit 5 and the second error rate accumulation circuit 6 receive the output of the timing generator circuit 7 in the step A2, the first error rate accumulation circuit 5 and the second error rate accumulation circuit 6 start calculations of error rates of the first receiving circuit 1 and the second receiving circuit 2 in the step A3. The first error rate accumulation circuit 5 and the second error rate accumulation circuit 6 continue to accumulate the error rates until the next input from the timing generator circuit 7 is supplied to the first error rate accumulation circuit 5 and the second error rate accumulation circuit 6 in the step A4. In the step A4, the first error rate accumulation circuit 5 and the second error rate accumulation circuit 6 continue to accumulate the error rates until the next timing pulse from the timing generator circuit 7 which is generated 2 seconds later.

Referring to FIG. 4 again, at a time when the next input from the timing generator circuit 7 is supplied to the first error rate accumulation circuit 5 and the second error rate accumulation circuit 6 in the step A4, the first error rate accumulation circuit 5 outputs the first accumulation value 28 of error rate and the second error rate accumulation circuit 6 outputs the second accumulation value 29 of error rate in the step A5. Assuming the first accumulation value 28=3% and the second accumulation value 29=0.2%, 3% and 0.2% represent the error rates of the first receiving circuit 1 and the error rate of the second receiving circuit 2 at the same time instance, respectively.

Then, in the step A6, the first judge circuit 8 and the second judge circuit 9 judge whether or not 3% and 0.2% are not larger than the first threshold value of 2%, respectively, and only the first judge circuit 8 outputs an active signal, indicating the first accumulation value being exceeded the threshold value of 2%, as the judge result 31.

The third judge circuit 10 exclusive-ORs the judge result 31 of the first judge circuit 8 and the judge result 32 of the second judge circuit 9. That is, the third judge circuit 10 judges whether or not the first and second judge results 31 and 32 of the first and second judge circuits 8 and 9 are coincident. Since, in this example, the third judge result 33 of the third judge circuit 10 indicates that the first and second judge results are not coincident, it is judged as that there is a possibility of fault in the first receiving circuit 1 or the second receiving circuit 2.

In a case where the third judge result of the third judge circuit 10 in the step A6 indicates that the judge results of the first and second judge circuits 8 and 9 are not coincident, the fourth judge circuit 11 judges in the step A7 whether or not a difference between 3% and 0.2% which are the accumulation values of the first and second error rate accumulation circuits 5 and 6 is not smaller than the second threshold value of 2.5%.

In this example, the difference between 3% and 0.2% is larger than the threshold value of 2.5%, therefore, the fourth judge result 34 of the fourth judge circuit 11 indicates that the difference is not smaller than the second threshold value of 2.5%, and it is judged that there is a fault in the first receiving circuit 1 or the second receiving circuit 2. That is, if Xa>Xb, the first receiving circuit 1 is faulty and, if Xa<Xb, the second receiving circuit 2 is faulty. Since, in this example, 3%>0.2%, the first receiving circuit 1 is faulty.

Then, in the step A9, the switch 3 selects a connection to the second receiving circuit 2.

Then, after the switch 3 selects the connection to the second receiving circuit 2 in the steps A9, the operation is returned to the step A2 to continue the fault detection.

When it is judged through the continuation of the fault detection that there is no fault, the diversity operation is resumed.

As described hereinbefore, in the present invention, the fault of the receiving circuits is detected on the basis of the error rates thereof and the connection to the normal receiving circuit is fixed. Therefore, according to the present invention, a diversity receiver which has no possibility of switching the connection to a faulty receiving circuit and is capable of preventing the communication quality from being degraded is provided.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A diversity receiver comprising:
    a pair of receiving circuits, each receiving a radio signal through an antenna and each outputting receiving data including an error rate and receiving level data indicating an electric field intensity;
    receiving level judge means for judging which one of said receiving circuits is outputting a higher level of said receiving level data, and for selecting and outputting said receiving data of the receiving circuit judged; and
    fault detection means for calculating said error rate of said receiving data of each of said receiving circuits, and for detecting a faulty one of said receiving circuits by a result of calculated error rate, and for disconnecting the detected faulty receiving circuit from operation,
    wherein said fault detection means comprises:
        a pair of error rate accumulation circuits, each coupled with a corresponding one of said receiving circuits, for accumulating error rate of said receiving data being output from said receiving circuit;
        a pair of first error rate judge circuits, each coupled with a corresponding error rate accumulation circuit for comparing the accumulated error rate, output from said error rate accumulation circuit, with a predetermined first value, and for outputting a first active signal indicating the accumulated error rate being exceeded by said predetermined first value;
        a first comparing circuits coupled with both of said first error rate judge circuits, for comparing the output signals of the first error rate judge circuits, and for outputting a second active signal when both of the output signals do not coincide with each other;
        a second error rate judge circuit, coupled with both error rate accumulation circuits, for comparing an absolute value of a difference of accumulated error rates, output from said each error rate accumulation circuit, with a predetermined second value, and for outputting a second active signal indicating that the absolute value of the difference of accumulated error rates exceeds said predetermined second value;
        a second comparing circuit coupled with said first comparing circuit and said second error rate judge circuit, for comparing output signals of said first comparing circuit and said second error rate judge circuit, and for outputting a third active signal when said output signals are said first active signal and said second active signal;
        a third error rate judge circuit, coupled with both error rate accumulation circuits for comparing accumulated error rates, output from said each error rate accumulation circuit, with each other, and for outputting a discrimination information indicative of the receiving circuit of said receiving circuits whose accumulated error rate is higher than the accumulated error rate of the other receiving circuit in said pair; and
        control means, coupled with said second comparing circuit and said third error rate judge circuit, for detecting output signal of said second comparing circuit, and for disconnecting from operation the receiving circuit indicated by said discrimination information of said third error rate judge circuit when said output signal of said second comparing circuit is said third active signal.

2. A diversity receiver as claimed in claim 1, wherein said fault detection means further comprises a timing generation circuit for generating a timing signal with which each of said error rate accumulation circuits accumulate error rate of said receiving data being output from said corresponding receiving circuit.

3. A diversity receiver including a pair of receiver circuits for receiving radio signals, respectively, receiving level judge means for judging one of said pair of receiver circuits outputting a higher level of receiving signal data and for selecting output data from the judged receiver circuit, said diversity receiver comprising:
    fault receiver detection means for detecting a condition where only one of said receiver circuits has an accumulated error rate in receiving signals during a predetermined period which is worse than a predetermined error rate value, for detecting when a difference between accumulated error rates in said receiving signals received by said receiver circuits exceeds a predetermined error rate difference, and for disconnecting the detected receiver circuit from operation.

4. The diversity receiver as claimed in claim 3, wherein said fault detection means comprises:

error rate accumulation means for accumulating respective error rates in receiving signals detected by each of said receiver circuits during a predetermined period;

fault detection means for detecting a fault receiver circuit having an accumulated error rate worse than a predetermined error rate value, and for determining whether an accumulated error rate difference between said receiver circuits exceeds a predetermined error rate difference; and control means for disconnecting the detected fault receiver circuit from operation.

5. The diversity receiver as claimed in claim 4, wherein said error rate accumulation means comprises:

a timing generator circuit for generating a predetermined period of timing; and a pair of error rate accumulation circuits, each coupled with a corresponding one of said receiver circuits, for accumulating an error rate in received signals output from a respective one of said receiver circuits during a timing period generated by the timing generator circuit.

6. The diversity receiver as claimed in claim 4, wherein said fault detection means comprises:

first judging means for judging whether a predetermined error rate value is satisfied by accumulated error rate of each of receiver circuits;

second judging means for judging whether an accumulated error rate difference between each of said receiver circuits exceeds a predetermined error rate difference when a judging result of the first judging means indicates that an accumulated error rate of one of said receiver circuits does not satisfy the predetermined error rate value; and detection means for detecting a faulty receiver circuit whose accumulated error rate is worse than the other when the judging result of the second judging means indicates that an accumulated error rate difference between each of said receiver circuits exceeds a predetermined error rate difference.

7. A diversity receiver including a pair of receiver circuits for receiving radio signal respectively, receiving level judge means for judging one of receiver circuits outputting higher level of receiving signal data and for selecting output data from the judged receiver circuit, said diversity receiver comprising:

a timing generator circuit for generating a predetermined period of timing;

a pair of error rate accumulation circuits, each coupled with a corresponding receiver circuit respectively, for accumulating error rate in received signals output from a respective receiver circuit during a timing period generated by the timing generator circuit;

first judging means for judging whether a predetermined error rate value is satisfied by an accumulated error rate of each of said receiver circuits;

second judging means for judging whether an accumulated error rate difference between each of said receiver circuits exceeds a predetermined error rate difference when a judging result of the first judging means indicates that accumulated error rate of one of said receiver circuits does not satisfy the predetermined error rate value;

detection means for detecting a faulty receiver circuit whose accumulated error rate is worse than the other when the judging result of the second judging means indicates that accumulated error rate difference between each of receiver circuits exceeds a predetermined error rate difference; and control means for disconnecting the detected fault receiver circuit from operation.

* * * * *